(No Model.)
J. F. H. GRONWALD & E. H. C. OEHLMANN.
VESSEL FOR STERILIZING AND TRANSPORTING MILK.
No. 454,267. Patented June 16, 1891.
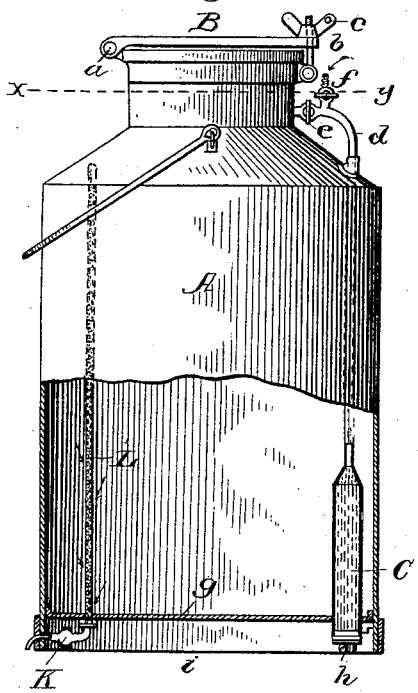
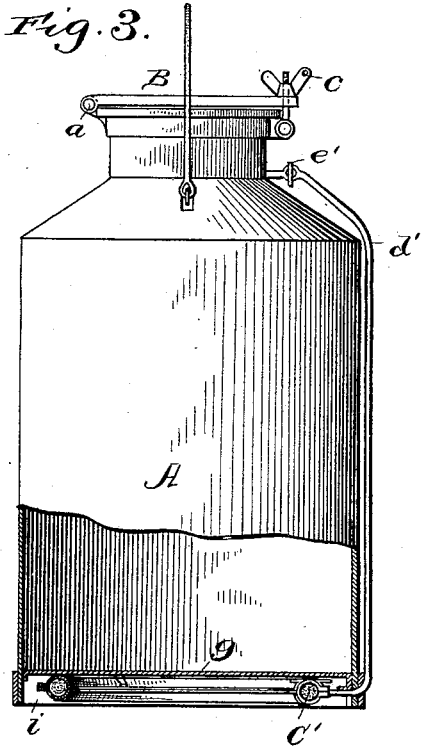
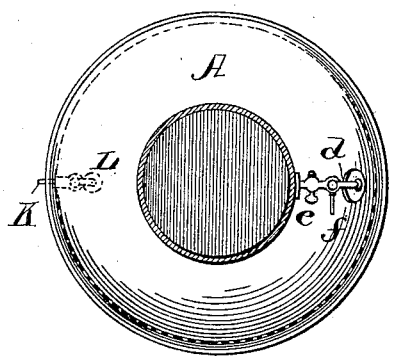
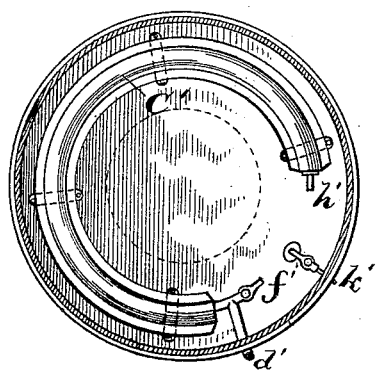
Witnesses:
J. B. McGinn.
H. M. Latham.
Inventors,
Johann Franz Hugo Gronwald
and Emil Heinrich Conrad Oehlmann,
by Richards & Co.
attys.
THE NORRIS PETERS CO., PHOTO-LITHO., WASHINGTON, D. C.

UNITED STATES PATENT OFFICE.

JOHANN FRANZ HUGO GRONWALD AND EMIL HEINRICH CONRAD OEHLMANN, OF BERLIN, GERMANY.

VESSEL FOR STERILIZING AND TRANSPORTING MILK.

SPECIFICATION forming part of Letters Patent No. 454,267, dated June 16, 1891.

Application filed March 1, 1890. Serial No. 342,315. (No model.)

*To all whom it may concern:*

Be it known that we, JOHANN FRANZ HUGO GRONWALD and EMIL HEINRICH CONRAD OEHLMANN, both subjects of the King of Prussia, residing at Berlin, Prussia, Germany, have invented new and useful Improvements in Milk-Vessels, of which the following is a full, clear, and exact description.

The present invention has for its object a vessel or receptacle in which to transport sterilized milk without appliances or means for cooling the same. This we accomplish by a special combination of an air-filter with the milk-vessel, which latter is provided with a delivery-cock, and in connection therewith a stop-cock and admission-cock arranged in the air-passage from the air-filter to the interior part of the vessel or receptacle.

Our invention further provides means whereby the milk may be drawn off in such manner that only air free of germs is admitted to fill its place and without exposing the milk to the danger of deterioration during the transportation or the drawing off from the cans, and it finally allows of the sterilization of the milk in the vessel itself and provides for the arrangement of seals by which the public may be assured of receiving milk that is really sterilized.

Two forms of constructing our newly-invented milk-vessel are illustrated in the drawings.

Figure 1 represents a side view, part section part elevation, of one form. Fig. 2 represents a horizontal section on line $x\ y$ of Fig. 1. Fig. 3 represents a side elevation, part section, of another form or modified construction of our improved milk-vessel; and Fig. 4 represents a horizontal section of Fig. 3, showing the construction of the filter.

The vessel A is provided with a lid B, hinged at $a$, which is tightly closed by means of the hinged screw $b$, fastened to the neck of the vessel and provided with the thumb-screw $c$. From the neck of the vessel a conduit $d$, provided with a stop-cock $e$ and an inlet-cock $f$, leads to an air-filter C, arranged in the vessel and filled with a suitable filtering material, such as wadding of cotton or any other suitable filtering material. This filter is placed below or passes through the bottom $g$ without projecting beyond the rim or base $i$, and is closed there with an air-screw $h$. The delivery-cock $k$ is also arranged at the bottom of the vessel. It is obvious that the closing devices shown here can be substituted by devices of a different construction.

The manipulation of the new milk-vessel depends upon whether it is to serve for the transportation of milk already sterilized or whether the milk is to be sterilized in the vessel. In the first case the vessel A, with its air-filter C, is sterilized in the following manner: The delivery-cock $k$ is connected to a steam-pipe, and the stop-cock $e$ in the air-conduit $d$ is opened, as is also the air-screw $h$ of the filter C. The steam admitted through the delivery-cock $k$ is thus allowed to pass through the vessel A, the air-conduit $d$, and the air-filter C until these parts are thoroughly sterilized. The air-screw $h$ is then closed, the admission of steam is cut off, and then the vessel A is cooled. The water of condensation thereby formed flows off in a receptacle fitted in the steam-admission pipe between the cock of the pipe and the delivery-cock $k$. Thereafter the cock is closed, the steam-admission pipe removed, and the milk-admission pipe is connected with $k$. The vacuum in the vessel, originated by the cooling of the same, can now effect or facilitate the admission of the sterilized milk. The filling being completed, the air-screw $h$ is opened, so that air free of germs flows into the interior of the vessel and replaces the vacuum. Thereupon the stop-cock $e$ and the air-screw $h$ are closed, and after sealing, which is usually done with lead, the thumb-screw $c$, the stop-cock $e$, the inlet-cock $f$, and the delivery-cock $k$ the vessel will be ready for shipment. Arrived at destination, only the seals of the delivery-cock $k$ and the stop-cock $e$ have to be removed, while those of the thumb-screw $c$, and the admission-cock $f$ remain untouched, preventing not only an adulteration of the milk, but preventing also the opening of the admission-cock $f$, whereby impure air might be admitted to the milk. This feature presents the guarantee to the consumers that the milkman cannot sell milk of inferior value out of the vessels known to contain only sterilized milk.

If the milk is to be sterilized in the vessel

A itself, it is only necessary to sterilize the air-filter C by connecting the admission-cock f with the steam-pipe after having opened the air-screw h. The steam is then admitted long enough to insure a thorough sterilization of the air-filter. The interior part of the vessel A is sterilized, together with the milk, by heating the vessel, with its contents, in the usual manner in a steam or water bath. During this operation the stop-cock e and the air-screw h are closed. It is desirable to sterilize the air-filter C after completing the sterilization of the milk, because it is heated then, and consequently the formation of condensing water is avoided.

In the modification represented in Figs. 3 and 4 the air-filter c', with its air-screw h', is arranged outside the vessel under its bottom, while the admission-cock f' and the stop-cock e' are adjusted in the air-pipe d', near its mouth, in the neck of the vessel.

The manipulation of this vessel remains the same in both cases—i. e., whether used for the shipment of previously-sterilized milk or of milk which is to be sterilized in the vessel.

It is not necessary to cool the vessel during the shipment or during the delivery of the milk, as all such matters which could effect a deterioration of the milk have been killed, and also because during the delivery only air free of germs is admitted through the air-filter. Before the delivery it will be desirable strongly to shake the milk in order to thoroughly mix again the films formed according to their specific weight during the shipment. The mixture of the milk can still be promoted by arranging an upwardly-running tube L on the mouth of the delivery-cock inside the vessel, this tube being perforated so as to receive the milk from all films or heights above the bottom during the delivery.

Having fully described our invention, what we claim as new, and desire to secure by Letters Patent, is—

The milk-vessel having a delivery-cock and adapted to be hermetically sealed, as described, in combination with an air-filter and a pipe connecting said filter with the interior of the vessel and provided with a stop-cock and with a steam-admission cock, substantially as set forth.

In witness whereof we have hereunto set our hands in presence of two witnesses.

JOHANN FRANZ HUGO GRONWALD.
EMIL HEINRICH CONRAD OEHLMANN.

Witnesses:
HERMANN BATCHE,
ALEX. SCHOLZE.